United States Patent [19]

Hamar

[11] Patent Number: 5,307,368
[45] Date of Patent: Apr. 26, 1994

[54] LASER APPARATUS FOR SIMULTANEOUSLY GENERATING MUTUALLY PERPENDICULAR PLANES

[76] Inventor: Martin R. Hamar, 70 Linden Tree Rd., Wilton, Conn. 06897

[21] Appl. No.: 941,747

[22] Filed: Sep. 8, 1992

[51] Int. Cl.$^5$ ............................................. H01S 3/08
[52] U.S. Cl. ................................... 372/107; 372/108; 372/23; 372/98; 356/152; 356/247
[58] Field of Search ............... 372/98, 107, 108, 23, 372/100; 356/152, 247

[56] References Cited

U.S. PATENT DOCUMENTS

| | | |
|---|---|---|
| 4,382,680 | 5/1983 | Hamar . |
| 4,468,119 | 8/1984 | Hamar . |
| 4,566,202 | 1/1986 | Hamar . |
| 4,674,870 | 6/1987 | Cain et al. . |
| 4,712,953 | 12/1987 | Witzel et al. . |
| 4,714,344 | 12/1987 | Hamar . |
| 4,815,845 | 3/1989 | Colbaugh et al. . |
| 4,840,483 | 6/1989 | Haffner . |
| 4,843,372 | 6/1989 | Savino . |
| 4,889,425 | 12/1989 | Edwards . |
| 4,942,588 | 7/1990 | Yasui et al. . |
| 4,963,022 | 10/1990 | Sommargren . |
| 4,985,898 | 1/1991 | Furuya et al. ........................ 372/100 |
| 5,048,030 | 9/1991 | Hiiro ................................... 372/100 |

Primary Examiner—Léon Scott, Jr.
Attorney, Agent, or Firm—Anthony J. Casella; Gerald E. Hespos

[57] ABSTRACT

A laser alignment apparatus is provided for generating a plurality of mutually perpendicular laser beams. The apparatus further includes rotatable beam diverters selectively hingedly moveable into or out of positions for diverting one of the laser beams. The beam diverters may be rotated about an axis coincident with the associated laser beam for sweeping laser planes. The laser planes swept by the respected beam diverters are mutually perpendicular to one another, and each laser plane is parallel to the other beams generated by the apparatus.

26 Claims, 5 Drawing Sheets

LASER APPARATUS FOR SIMULTANEOUSLY GENERATING MUTUALLY PERPENDICULAR PLANES

BACKGROUND OF THE INVENTION

Laser emitters and photosensitive targets are widely used in industry for aligning machine components to one another. The prior art laser emitter projects a substantially straight beam toward the photosensitive target. The prior art target precisely identifies the location of the center of energy of the laser beam impinging thereon. Signals generated by the prior art photosensitive target can be used to accurately identify displacement errors and angular alignment errors between the prior art laser emitter and target.

The prior art combination of a laser emitter and a photosensitive target may be used, for example, to align a machine tool to a work piece. Displacement and angular alignment errors between the machine tool and the work piece can be determined by the prior art laser alignment equipment. Available laser alignment equipment also can mathematically convert the error readings into required adjustments on either the machine tool or the work piece. Correction of such errors ensures more accurately machined parts, longer tool life and less down-time for the machine tool. Very effective laser alignment systems for these purposes are disclosed in U.S. Pat. No. 4,566,202 which issued to the inventor herein on Jan. 28, 1986 for "LASER APPARATUS FOR EFFECTIVELY PROJECTING THE AXIS OF ROTATION OF A ROTATING TOOL HOLDER" and in copending patent application Ser. No. 427,759 which was filed by the inventor herein on Oct. 26, 1989 for "LASER ALIGNMENT CONTROL SYSTEM."

The prior art also has included laser emitters which are operative to sweep a substantially flat laser plane. A device of this type is shown and described in U.S. Pat. No. 4,468,119 which issued to the inventor herein on Aug. 28, 1984 and which is entitled "PENTA-PRISM MODULE HAVING LASER ALIGNMENT ERROR DETECTION AND CORRECTION CAPABILITY." The apparatus shown in U.S. Pat. No. 4,468,119 directs a laser beam to a penta-prism that is operative to reflect an input laser beam internally, and to produce an output beam aligned at precisely 90° to the input beam. The penta-prism of the apparatus shown in U.S. Pat. No. 4,468,119 can be rotated about the axis of the input beam. Thus, the output laser beam from the rotating penta-prism effectively sweeps a plane that is perpendicular to the input beam. This plane can be used as a reference to which the alignment and/or position of other objects can be compared. For example, some machines are intended to have a plurality of coupled drive shafts disposed in end-to-end linear relationship defining, for example, the Z-axis. The apparatus shown in U.S. Pat. No. 4,468,119 can be used to sweep a plane parallel to the specified Z-axis of the coupled shafts to be aligned. Photocell targets may be fixtured simultaneously or sequentially at a plurality of locations along the coupled shafts to be aligned, and their respective Y-axis positions relative to the laser plane swept by the apparatus of U.S. Pat. No. 4,468,119 can be determined. Rotation of the penta-prism can be stopped to direct the diverted laser beam parallel to the specified Z-axis of the shafts. The X-axis offsets then can be measured. Selected shafts can be adjusted to achieve the required linear alignment.

Some prior art machines include components that should be aligned three dimensionally. For example, at least one coupling in the above described system of shafts may have a specified Z-axis location. The above described laser apparatus can be set up at location laterally offset from the specified Z-axis location. A beam can then be projected parallel to the X-axis, and the position of a target mounted on the coupling can be determined. Similar alignment problems occur in mills where a plurality of components are rotatably driven about parallel axes. Drive components for each of the rotatable members may be specified for disposition in a common Y-Z plane extending perpendicular to each of the respective rotational axes. Several of the rotatable members may be specified to lie in a common horizontal or X-Z plane, while others may be specified to lie in a vertical or X-Y plane. A complex machine of this type could include many alignment errors, any one of which could effect the quality of the finished product produced by the machine, the efficiency of the machine, the life of various components in the machine and the frequency of down-time for maintenance or repairs.

It can be difficult to perform all of the above described alignment checks with the prior art laser apparatus. In particular, some alignment checks must be performed sequentially with the prior art apparatus, and each sequential check may require a new setup of the laser alignment apparatus. It is desireable to minimize the number of setups and the time required for setups of the laser alignment machines.

Figure 1:
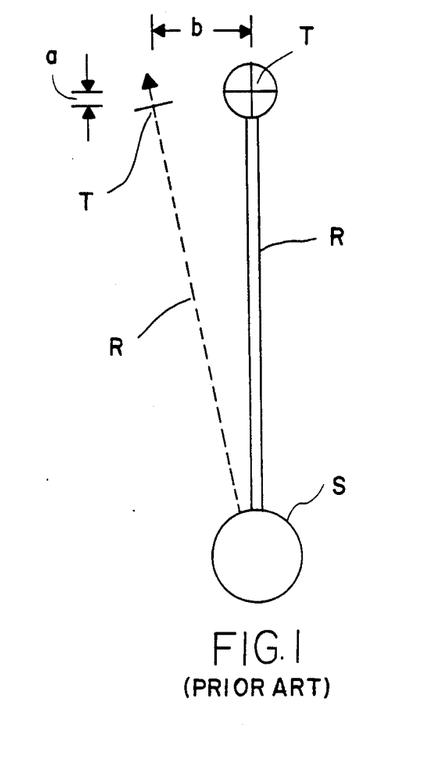
FIG. 1 is a schematic illustration of a prior art target assembly.

Certain types of alignment checks will produce inaccurate results due to unavoidable errors in a target location relative to a component being aligned. For example FIG. 1 schematically shows a prior art target T mounted to a rod R and used with a prior art laser apparatus (not shown) to check the X-axis and Y-axis position of a shaft S. If the rod R is perfectly aligned along the Y-axis, positions of the shaft S can be determined. However, precise vertical alignment of the rod R generally cannot be assured, and an exaggerated nonvertical alignment is shown by the line R'. This inevitable offset of the rod R' will introduce errors into the X-axis and Y-axis readings of the target T'. The Y-axis error is indicated by dimension "a" in FIG. 1. This is referred to as a sine error, in that the magnitude of "a" is a function of the sine of the angle between R and R'. Sine errors generally are small enough to be tolerated. The X-axis error is indicated by dimension "b" and is a cosine error. Cosine errors can be very significant. The prior art laser apparatus used to check offsets relative to two axes typically would yield one reading subject to a cosine error.

In view of the above, it is an object of the subject invention to provide a versatile laser alignment apparatus that can be used to perform alignment in a broad range of both complex and simple industrial applications.

It is a further object of the subject invention to provide a laser alignment apparatus that minimizes setup time.

A further object of the subject invention is to provide a laser apparatus that avoids multiple setups for alignments.

Still an additional object of the subject invention is to provide laser alignment apparatus for comparing one or more objects to be aligned to a plurality of frames of reference simultaneously.

Yet a further object of the subject invention is to provide a laser apparatus that can avoid cosine errors.

SUMMARY OF THE INVENTION

The subject invention is directed to a laser apparatus for generating a plurality of laser beams. The laser beams may be generated from a plurality of separate laser sources or from a single laser source that is optically divided. More particularly, the apparatus of the subject invention may comprise means for generating a plurality of mutually perpendicular laser beams. The laser apparatus may further comprise means for generating at least one laser plane. The means for generating the laser plane may comprise a penta-prism that is operative to divert a laser beam through precisely 90°. The penta-prism may be rotatable about the input laser beam, such that the output laser beam sweeps a laser plane perpendicular to the input laser beam. The penta-prism, or other such beam diverter preferably is selectively movable into and out of the path of a laser beam produced by the apparatus. Thus, the apparatus is operative to either generate a laser beam or to sweep a laser plane orthogonal to the generated laser beam, depending upon the selected position of the penta-prism.

In a preferred embodiment, the apparatus is operative to generate a plurality of mutually perpendicular laser beams, each of which has a rotatable penta-prism selectively movable into and out of the path of the generated laser beam. Thus, the apparatus may produce: a plurality of mutually perpendicular laser beams; a plurality of mutually perpendicular laser planes; or at least one laser beam and at least one laser plane parallel thereto.

A maximum of three mutually perpendicular laser beams or three mutually perpendicular laser planes may be generated by the apparatus. This embodiment of the subject laser apparatus enables two mutually perpendicular laser planes to be generated along with one laser beam parallel to both. Alternatively, this embodiment of the subject apparatus enables the generation of two mutually perpendicular laser beams and a laser plane parallel to both. The simultaneous generation of at least one laser beam and at lest one laser plane reduces the number of equipment set-ups and generally avoids the above described cosine errors.

The mutual perpendicularity of the laser beams and/or laser planes produced by the subject laser apparatus is important for accurately aligning industrial equipment. As a result, the laser apparatus of the subject invention preferably comprises means for initially achieving mutual perpendicularity and/or means for periodically adjusting the apparatus to assure mutual perpendicularity. The adjustment means preferably is operative to achieve mutual perpendicularity to within one arc second or less.

In a preferred embodiment, the laser apparatus further includes a plurality of mutually perpendicular support surfaces each of which defines a plane perpendicular to one of the laser beams that may be generated by the apparatus and/or parallel to one of the laser planes that may be swept by the apparatus. Thus, the laser beams and/or the laser planes may be oriented in any desired disposition relative to horizontal and vertical planes and/or relative to an apparatus to be aligned.

The apparatus of the subject invention may include or be usable with at least one photocell target that is operative to identify precise coordinates of the center of energy of a laser beam impinging thereon. The apparatus may further include or be usable with data processing means for calculating alignment and/or adjustment data based on input form at least one photocell target.

The subject invention is further directed to a method for achieving mutual perpendicularity between a plurality of laser beams. The method may include placing a first support surface of the laser apparatus on a substantially planar surface and generating a first laser beam substantially perpendicular to the support surface. The method further includes adjusting the first laser beam to achieve precise perpendicularity to the first support surface. This fine adjustment of the first laser beam can be achieved with a tilt plate, or other such adjustment mechanism incorporated into the apparatus. The rotational axis of the first penta-prism is then squared up to the first laser beam. The first penta-prism then can be rotated to sweep a laser plane parallel to the first support surface. A second laser beam is generated from the apparatus to be approximately perpendicular to the first laser beam and approximately parallel to the plane swept by the first laser beam. First and second targets, spaced from one another and adjustably mounted to a rigid fixture, are then employed to achieve parallelism between the first laser plane and the second laser beam. In particular, the fixture is placed close to the laser apparatus and the first and second target are adjustably moved on the fixture to be centered on the first laser plane and the second laser beam respectively. The fixture and targets are then moved further away from the laser apparatus (e.g. 20 feet). The fixture is positioned so that the first target is centered on the first laser plane, and the second laser beam is adjusted to be centered on the second laser target. This latter adjustment will ensure that the second laser beam is parallel to the first laser plane. The rotational axis of the second penta-prism is then squared to the second laser beam. Thus, the plane swept by the second penta-prism will be parallel to the first laser beam and perpendicular to the first laser plane. The process may be completed for a third beam to ensure mutual perpendicularity between all three beams and all three laser planes.

The apparatus with plural mutually perpendicular laser beams and/or plural mutually perpendicular laser planes enables extremely effective laser alignment for many industrial applications. With reference to the hypothetical machine described above, the subject laser apparatus can enable accurate alignment with a single setup. For example, a first laser plane generated by the apparatus can be used as a reference to which Y-axis positions of the shafts can be compared. A second plane generated by the apparatus can be used as a reference to which X-axis positions of the shafts can be compared. A Z-axis position of a selected location on the shafts further can be compared by measuring offsets from the third mutually perpendicular plane. Non-rotating laser beams similarly can be used to check alignment of one or more components relative to a frame of reference. In effect, the apparatus of the subject invention creates an imaginary room with mutual perpendicular walls, ceiling and floor and enables extremely accurate measurements to that imaginary room to be developed. In this manner, alignment checks and adjustments to a machine component can be made accurately with a single setup of the laser apparatus. Furthermore, measurements can be carried out to avoid the above described cosine errors that had been difficult to avoid with the prior art.

DETAILED DESCRIPTION OF THE PREFERRED EMBODIMENT

Figure 2:
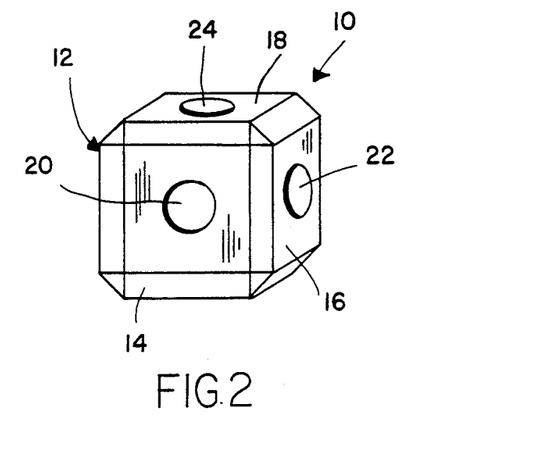
FIG. 2 is a perspective view showing the diode mounting faces of an apparatus in accordance with the subject invention.
Figure 3:
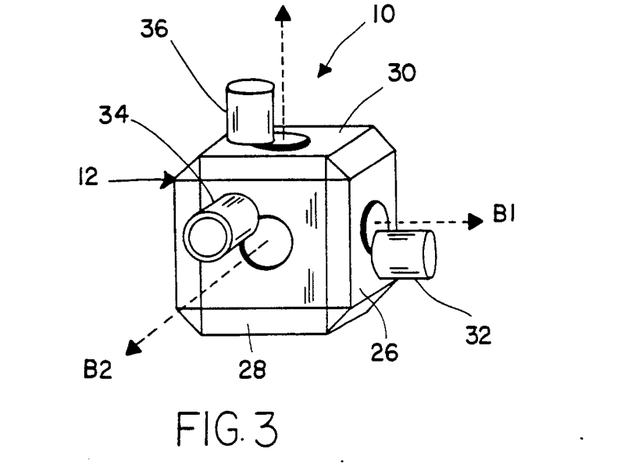
FIG. 3 is a perspective view showing the laser projecting faces of the apparatus in FIG. 2, for projecting three mutually perpendicular laser beams.

A laser apparatus in accordance with the subject invention is identified generally by the numeral 10 in FIGS. 2 and 3. The apparatus 10 includes a housing 12 generally in the form of a substantially hollow cube with apertures extending entirely therethrough and connecting opposed faces of the housing 12. In particular, and with reference to FIG. 2, the housing 12 includes first, second and third adjacent mutually perpendicular mounting faces 14, 16 and 18 respectively. First, second and third laser diode assemblies 20, 22 and 24 are mounted in the first, second and third mounting faces 14, 16 and 18 respectively such that the diode assemblies 20, 22 and 24 are oriented to project laser beams through the substantially hollow cubical housing 12.

Figure 4:
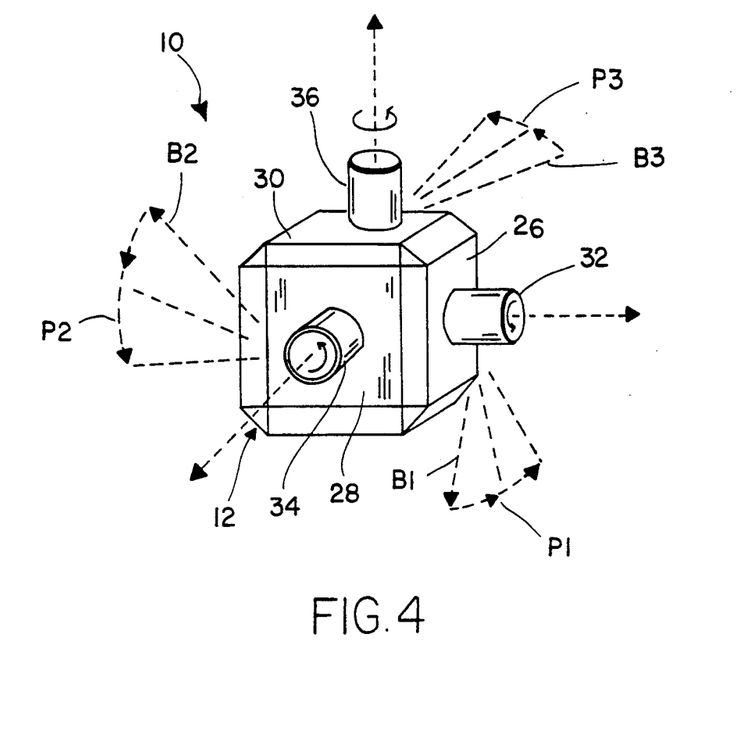
FIG. 4 is a perspective view similar to FIG. 3, but with the scanners sweeping three mutually perpendicular laser planes.

The housing 12 is further characterized by first through third laser projecting faces 26, 28 and 30 respectively, as shown in FIGS. 3 and 4. The first laser projecting face 26 is in opposed substantially parallel relationship to the first mounting face 14 of the housing 12. Similarly, the second laser projecting face 28 is in opposed parallel relationship to the second mounting face 16, and the third laser projecting face 30 is in opposed substantially parallel relationship to the third mounting face 18. With this construction, a first laser beam from the first diode assembly 20 will project through the substantially hollow housing 12 and from the first laser projecting face 26. Similarly, a second laser beam from the second diode assembly 22 will project through the housing 12 and from the second laser projecting face 28 of the housing. Still further, a third laser beam from the third diode assembly 24 will project through the housing 12 and from the third laser projecting face 30 thereof. The first through laser beams from the respective first through third diode assemblies 20-24 initially will be approximately mutually perpendicular. However, adjustment means incorporated into the housing 12, as explained further herein, enables very precise mutual perpendicularity to be achieved for the laser beams being projected from the first through third laser projecting faces 26-30 respectively of the housing 12.

Figure 5:
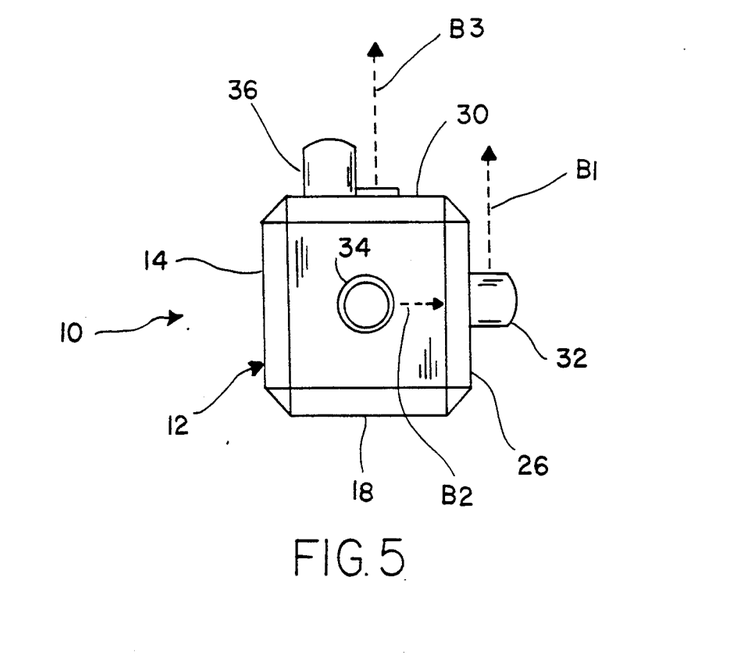
FIG. 5 is a front elevational view of the apparatus shown in FIGS. 2-4.

The first through third laser projecting faces 26-30 are provided with first through third hingedly mounted scanners 32, 34 and 36 respectively. Each scanner 32-36 includes a penta-prism therein which is operative to receive an input laser beam and reflect the input laser beam through an angle of 90°. Each of the scanners 32-36 may be hingedly rotated into alignment with the laser beam projected from the respective first through third laser diode assemblies 20-24, as shown in FIG. 4. Alternatively, each of the scanners 32-36 may be hingedly rotated into an alignment where they are offset from the laser beam projecting from the respective first through third laser diode assemblies 20-24, as shown in FIG. 3. For example, with reference to FIG. 5, the third scanner 36 is illustrated as being rotated into an off-line position which permits the laser beam B3 emitted from the third laser diode assembly (not shown) to be projected perpendicularly from the plane defined by the first laser projecting face 30. Alternatively, the first and second scanners 32 and 34 respectively are hingedly rotated into the parts of the laser beams projected from the respective first and second laser diode assemblies. Thus, the respective first and second laser beams B1 and B2 respectively are reflected 90° and extend substantially parallel to the planes defined by the first and second laser projecting faces 26 and 28 of the housing 12.

Each of the first through third scanners 32-36 is provided with a magnetic catch illustrated and described in greater detail below to releasably lock the respective scanner 32-36 in the hinged orientation for diverting the laser beam 90°. Other hinged, swivelling or tilting means could be provided to selectively position the respective scanner 32-36 in and out of the path of the associated laser beam. Additionally, each of the first through third scanners 32-36 is rotatable about the axis of the input laser, as illustrated in FIG. 4. Rotation of the scanners 32-36 can enable the diverted laser beam B1, B2 and B3 to generate laser planes P1, P2 and P3 perpendicular to the laser beams approaching the respective scanners 32-36.

Figure 6:
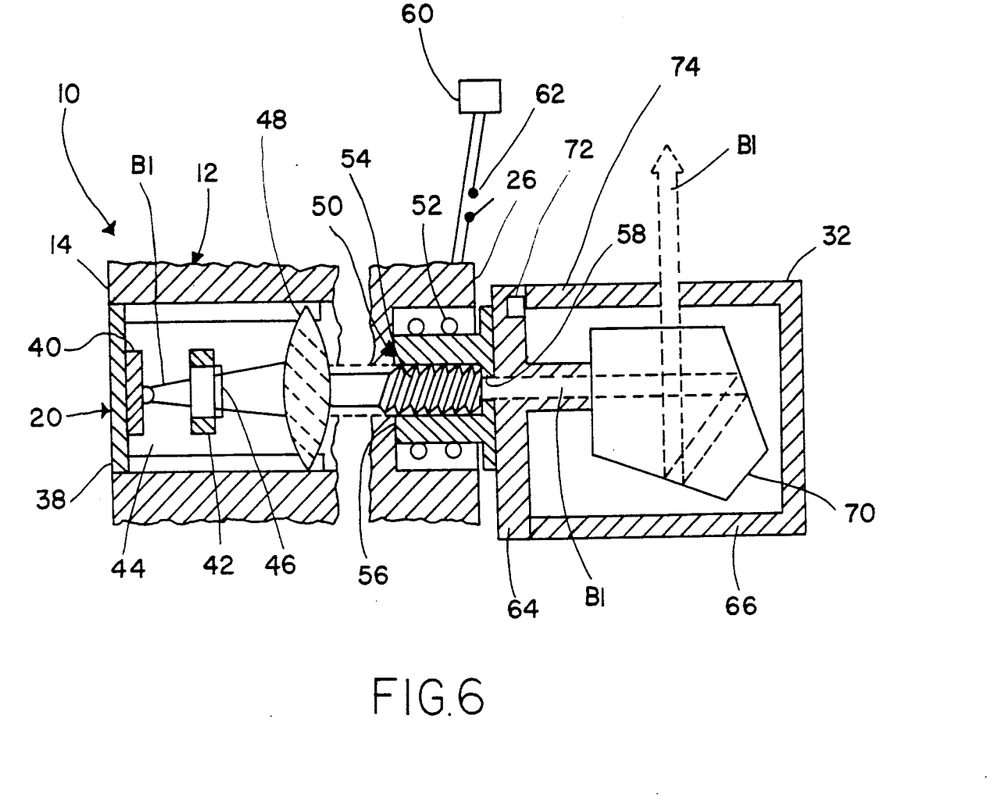
FIG. 6 is a schematic cross-sectional view operative components of a laser emitter incorporated into the apparatus of the subject invention.

FIG. 6 schematically illustrates the first diode assembly 20 mounted to the first mounting face 14 of the housing 12, and the first scanner 32 mounted to the first laser projection face 26 of the housing 12. A portion of the housing 12 intermediate the first mounting face 14 and the first laser projection face 26 has been omitted for simplification of this schematic illustration. It is to be understood, however, that the second and third diode mounting assemblies 22 and 24 and the second and third scanner assemblies 34 and 36 are substantially identical. Additionally, it is to be understood that all three laser beams intersect in perpendicular alignment to one another substantially at the center of the housing 12.

The first diode assembly 20 includes a base plate 38 mounted to the housing 12. A laser emitting diode 40 is mounted to the base plate 38 and is disposed to direct a laser beam B1 toward the first laser projection face 26 of the housing 12. A tilt plate 42 is adjustably mounted to the base plate 38 by nylon tipped set screws 44 which enable independent adjustment of pitch and yaw. The tilt plate 42 is an annular member through which the first laser beam B1 may pass. However, a thin transparent mylar sheet 46 extends across the annular support of the tilt plate 42. The mylar film 46 preferably defines a thickness of approximately 0.0075 inch or 0.2 mm, with opposed faces of the mylar film 46 being parallel to one another. The mylar film 46 functions as any transparency through which a light beam is projected. In particular, a beam impinging on a transparency at an angle refracts in one direction upon entry into the transparency and refracts back in the opposed direction upon exiting the transparency. Thus, the exiting beam is parallel to the entering beam but is offset therefrom. The amount of offset or shift is a function of the thickness of the transparency, the index of refraction and the angle of the beam to the mylar film 46. Thick transparent sheets cause a relatively large shift between the entering and exiting beams. Conversely, thin sheets, such as the thin malar sheet 46 cause relatively minor shifts. By turning the set screws 44, the tilt plate 42 can be tilted relative to the incoming laser beam B1. This tilting can cause a shift in the first laser beam B1 upon exiting the mylar film 46. In view of the very small thickness of the mylar film 46, relatively gross adjustments in the angular alignment of the tilt plate 42 are operative to cause very small shifts in the first laser beam B1 exiting from the mylar film 46. Thus, shifting of the first laser beam B1 can be precisely controlled.

The laser assembly 20 further includes a lens 48 for focusing and aligning the first laser beam B1. In particular, the first laser beam B1 will exit from the lens 48 at an angle which varies in accordance with the relative axial position of the entering laser beam B1. As noted above, the laser beam B1 exiting the mylar film 46 of the tilt plate 42 can be shifted by altering the position of the set screws 44. This effectively shifts the axial position of the first laser beam B1 entering the lens 48, and thereby alters the angle of the beam exiting the lens 48. As explained above and further herein, the combination of the tilt plate 42 and the lens 48 are used to alter the alignment of the first laser beam B1 relative to the walls of the generally cubical housing and relative to the second and third laser beams B2 and B3 for achieving mutual perpendicularity therebetween to within one arcsecond.

A laser beam is not of uniform intensity over its entire cross-section, and is not symmetrical about its central axis. Rather, the energy of a laser beam decreases substantially at further distances from the center of the beam. Additionally, the rate of change is not uniform across all axes. The diode laser beam defines an elliptical cross-section of energy. Additionally, the center of energy produced by a diode laser will periodically shift in accordance with temperature and the manner by which it has been handled. Many laser systems require re-centering or calibrating operations to be performed prior to each usage. The apparatus 10 avoids those problems that were present in some prior art lasers by providing a hollow spindle with a flooded aperture. In particular, a spindle 50 is rotatably mounted within bearings 52. The spindle 50 includes a bore 54 extending axially therethrough. The bore 54 is characterized by a large entry 56 facing inwardly on the housing 12 and toward the laser diode 40. The bore 54 is further characterized by an exit aperture 58 facing outwardly from the housing 12. The exit aperture 58 from the bore 54 is small compared to the entry 56 to the bore 54. The interior surface of the bore 54 preferably is threaded to define an array of internal ridges that minimize the amount of laser light reflecting off the interior surfaces of the bore 54 and toward the aperture 58. Aperture 58 is concentric to the axis of rotation of the spindle so any movement of input beam does not cause the output beam to vary its position. With this construction, the exit aperture 58 from the bore 54 is flooded by the laser light entering the bore 54. Thus, only the center most portion of the incoming laser beam B1 passes entirely through the spindle 50. The less intense fringe regions of the entering laser beam B1 are effectively culled to achieve a beam having a substantially circular cross-section of substantially uniform intensity thereacross. Furthermore, by precisely manufacturing the spindle 50, minor shifts of the diode 40 due to temperature, handling and other factors become irrelevant. Rather, a centered beam B1 of uniform intensity and circular cross-section is assured without the frequent re-centering of the diode that had been required with prior art systems.

The apparatus 10 further includes a motor for rotatably driving the spindle 50 within the bearings 52 and about the rotational axis of the laser beam B1. The electric motor is illustrated schematically in FIG. 6 and is identified generally by the numeral 60. A switch 62 enables selective operation of the motor 60. Comparable rotatable driving means preferably are provided for the other two lasers of the apparatus 10. The spindle 50 further includes adjustment screws 63 which enable the rotational axis of the spindle 50 to be coincident with the axis of the first laser beam B1.

The first scanner 32 is rigidly mounted to the exterior end of the spindle 50. Thus, the scanner 32 will selectively rotate with the spindle 50. The first scanner 32 includes a scanner base 64 which defines the portion of the scanner 32 that is rigidly connected to the spindle 50. A scanner cap 66 is pivotally connected to the scanner base 64. The scanner cap 66 houses a penta-prism 70 which is aligned with the first laser beam B1 passing from the flooded exit aperture 58 of the spindle 50. The penta-prism 70 is operative to internally reflect the laser beam such that the exiting portion of the first laser beam B1 is aligned orthogonally to the incoming portion thereof.

When the scanner cap 66 is in the pivoted condition depicted in FIG. 6, the portion of the first laser beam B1 exiting therefrom will be orthogonal to the portion of the first laser beam B1 entering the scanner 32. Additionally, with the scanner cap 66 in the pivoted orientation depicted in FIG. 5, a portion of the first laser beam B1 exiting from the scanner 32 will be substantially parallel to the first laser projecting face 26 of the housing 12. Alternatively, the scanner cap 66 can be pivoted approximately 180° about a hinge pin (not shown) such that the penta-prism 70 is offset from the first laser beam B1 passing from the flooded exit aperture 58 of the spindle 50. In this disposition of the scanner cap 66, the first laser beam B1 will continue along its original axis, and will not be reflected into the orthogonal alignment shown in FIG. 6.

Mutual perpendicularity of the beams B1, B2 and B3 and mutual perpendicularity of the planes P1, P2 and P3 is important for the apparatus 10 to achieve its full potential. The beams B1-3 and the planes P1-P3 generally will be accurately aligned prior to the initial sale of an apparatus 10. The alignment typically will not be altered or adjusted by the technician performing a machine alignment with the apparatus 10. However, alignment may be checked and adjusted from time to time as described herein.

With reference to FIGS. 3, 4, 7 and 8, a desireable first step in an alignment process is to square the first laser beam B1 to the first mounting face 14 of the housing 12. This preliminary alignment step can be carried out by simply placing the first mounting face 14 of the housing 12 on an approximately planar surface and pivoting the first scanner 32 into its off-line orientation. The first laser beam B1 is then projected approximately orthogonally from the surface on which the first mounting face 14 is positioned. Available targets are employed and the set screws 44 are adjusted to make the first beam B1 orthogonal to the first mounting face 14.first diode mounting face 14.

The second step in the alignment process is to square the axis of rotation of the spindle 50 on the first beam B1 by using the adjustment screws 63. This assures that the first plane P1 is perpendicular to the first laser beam B1 and parallel to the first diode mounting face 14.

The third step in the alignment process is to make the second laser beam B2 orthogonal to the second mounting face 16 of the housing 12, in substantial the manner used in step one.

Figure 7:
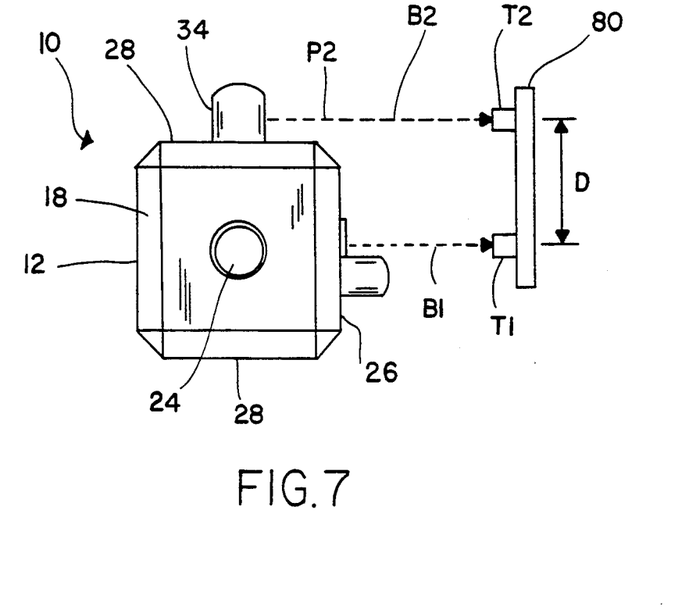
FIG. 7 is a schematic illustration of the apparatus of the subject invention in combination with a target assembly for accurately achieving perpendicularity of a plurality of laser beams.

The fourth step in the alignment process is to align the second laser beam B2 to be parallel to the first laser plane P1. This is accomplished by using a target apparatus 80 having a rod, or other such fixture, with first and second laser targets T1 and T2 thereon as shown in FIG. 7. The distance "D" between the targets T1 and T2 is adjusted to be equal to the actual distance between the first laser plane P1 and the second laser beam B2 when the target fixture is near the laser. The target apparatus 80 is moved and mounted at a further distance from the apparatus 10. The first target T1 is centered on the first laser plane and readings of the second laser beam B2 on the second target T2 are taken. These readings provide an accurate measurement of the actual distance between the first laser plane P1 and the second laser beam B2 for the farther position of the target apparatus 80. If the first laser plane P1 and the second laser beam B2 are parallel, the distances therebetween will be identical for the near and far locations of the target apparatus 80. If these respective readings are not identical, the alignment of the second laser beam B2 will be adjusted by using the tilt plate for the second laser beam B2 as described with reference to FIG. 6.

The axis of rotation of the second spindle with the second laser beam B2 is aligned to be coincident with the second laser beam B2, as explained with respect to the second step above. At this point in the alignment procedure, the second laser beam B2 has been made parallel to the first laser plane P1 and hence perpendicular to the first laser beam B1. Additionally, the alignment of the second spindle to the second laser beam B2 assures that the second laser plane P2 is perpendicular to the second laser beam B1 and perpendicular to the first laser plane P1. It follows that the second laser lane P2 will be parallel to the first laser beam B1, and the alignment can be checked as explained in step four above.

Figure 8:
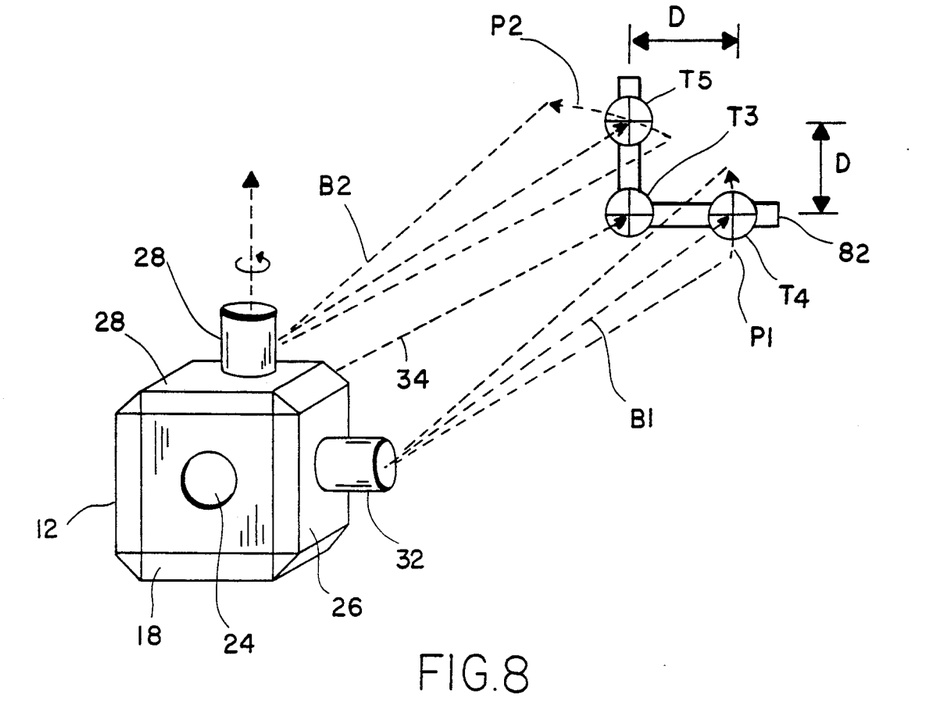
FIG. 8 is a perspective view of the laser apparatus in combination with a target for achieving mutual perpendicularity of laser beams.

The alignment procedure continues by making the third laser beam B3 parallel to both the first and second laser planes P1 and P2. This can be done by carrying out step four twice, namely once for the first laser plane P1 and again for the second laser plane P2. Alternatively, this phase of the alignment procedure can employ a generally L-shaped target apparatus 82 having three photosensitive targets T3, T4 and T5 thereon as shown in FIG. 8. The target T3 is located at the intersections of the legs of the L-shaped target apparatus 82. The targets T4 and T5 are located on the respective legs and at the distance D from the target T3. The target apparatus 82 is positioned at a selected distance from the apparatus 10 such that the target T3 is impinged upon by the third laser beam B3 and such that the targets T4 and T5 are impinged upon by the first and second laser planes P1 and P2. The target apparatus is fixtured such that the three targets are substantially zeroed out on the third laser beam B3 and the first and second laser planes P1 and P2 respectively. The target apparatus 82 is then moved further from the laser apparatus 10, and additional readings are obtained. If the third laser beam B3 is perfectly parallel to the first and second laser planes P1 and P2, the readings will be substantially identical at the first and second distances from the laser apparatus 10. If the readings are not identical, however, adjustments to the alignment of the third laser beam B3 to bring the third laser beam into parallel with the first and second laser planes P1 and P2.

As a final step, the third spindle is centered on the third laser beam B3 as described above. Thus, the third laser plane P3 will be perpendicular to the third laser beam B3, and hence will also be perpendicular to the first and second laser planes P1 and P2.

Figure 9:
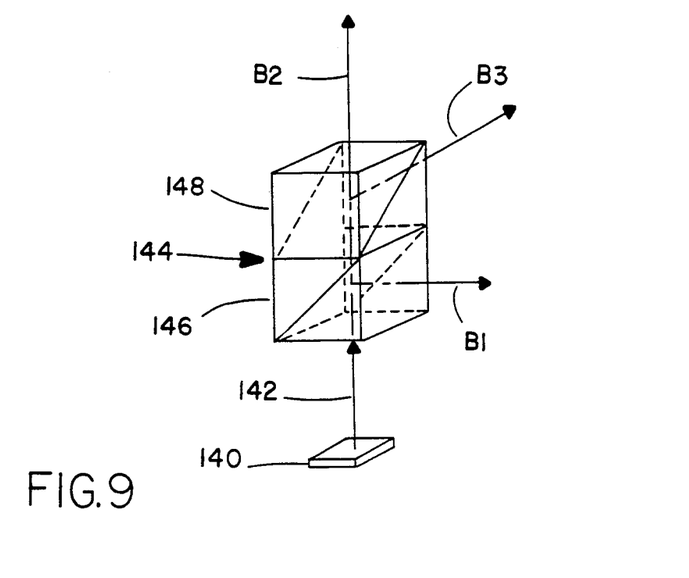
FIG. 9 is a schematic illustration of a second embodiment of the subject invention employing a single laser source and a beam splitter for generating mutually perpendicular laser beams.

The above described embodiment shows a separate laser source for generating each of the mutually perpendicular laser beams. The apparatus can, however, use only a single laser source and appropriate optical means for generating a plurality of mutually perpendicular output laser beams. In particular, with reference to FIG. 9, a single laser emitting diode 140 is provided for emitting an input laser beam 142. The input beam 142 is directed from the laser diode 140 to a beam splitter assembly 144. The beam splitter assembly includes a first beam splitter 146 which functions to transmit approximately 70% of the input beam 142 substantially along the axis of the input beam 142. The remaining 30% of the input beam 142 is reflected substantially precisely 90% to define an output laser beam B1. The beam splitter assembly 144 further includes a second beam splitter 148 which functions to transmit approximately one half of the laser beam impinging thereon along substantially the same axis as the input beam 142. The portion of the laser beam transmitted axially through the second beam splitter 148 defines output beam B2, as shown in FIG. 9. The remaining portion of the laser beam impinging upon the second beam splitter 148 is reflected 90% and defines the third output laser beam B3. The apparatus employing the laser assembly depicted in FIG. 9 will further include a lens, a tilt plate and a scanner assembly for each of the output beams B1, B2 and B3.

Figure 10:
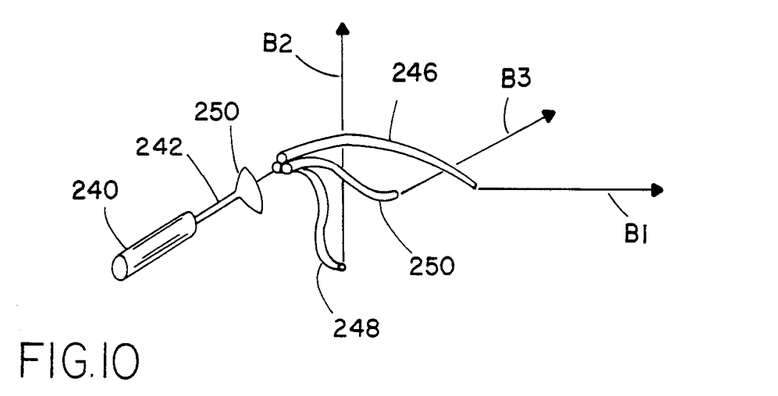
FIG. 10 is a schematic illustration of a third embodiment using a single laser source and single mode optical fibers for generating a plurality of mutually perpendicular laser beams.

FIG. 10 schematically illustrates a third embodiment for generating three mutually perpendicular laser beams from a common source. In particular, a diode laser source is identified generally by the numeral 240 in FIG. 10 and is operative to generate a laser beam 242 toward a focusing lens 244. The focusing lens directs the laser beam 242 toward ends of three single mode optical fibers 246, 248 and 250. The optical fibers 246-250 will extend along a convenient and efficient path in the laser alignment apparatus and will be directed toward lenses, tilt plates and scanner assemblies as described above. It will be appreciated that in this embodiment the laser source 240, the focusing lens 244 and portions of the optical fibers 246-250 may be at a location remote from other portions of the apparatus, including the tilt plates and scanners.

Figure 11:
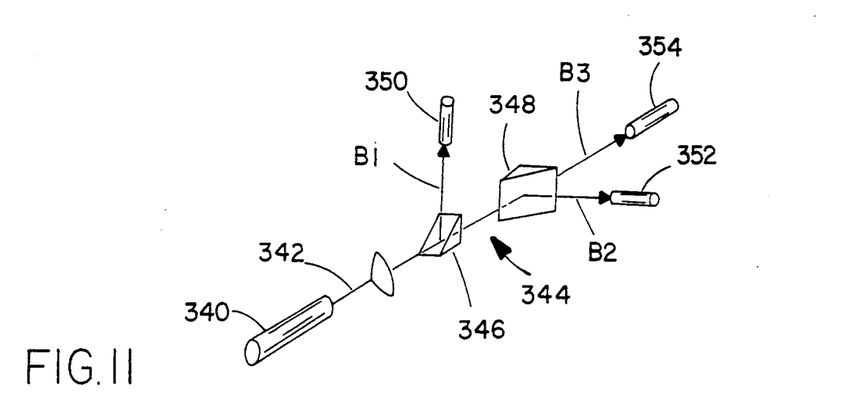
FIG. 11 is a schematic illustration of a fourth embodiment using a single laser source and both a beam splitter and optical fibers for generating mutually perpendicular beams.

FIG. 11 illustrates a fourth embodiment using elements of all three previous embodiments. In particular, FIG. 11 shows a laser source 340 for generating a laser beam 342. A beam splitter assembly 344 includes a first beam splitter 346 for generating a first output beam B1. A second beam splitter 348 generates second and third output beams B2 and B3 respectively. The first through third output beams B1-B3 are directed respectively toward first through third single mode optical fibers 350, 352 and 354. The optical fibers 350-354 may then extend to focusing lenses, tilt plates and scanner assemblies as described in the previous embodiments.

While the invention has been described with respect to a preferred embodiment, it is apparent that various changes can be made without departing from the scope of the invention as defined by the appended claims.

I claim:

1. A laser apparatus comprising:
   a housing;
   laser generating means mounted in the housing for generating a plurality of laser beams generally perpendicular to one another; and
   beam adjustment means disposed in alignment with at least one of said laser beams for adjusting alignment of the at least one said laser beam to achieve accurate perpendicularity between said laser beams.

2. An apparatus as in claim 1, wherein the plurality of laser beams comprise three mutually perpendicular laser beams, and wherein the beam adjustment means comprises at least two beam adjustment means disposed respectively in paths of at least two of said three laser beams.

3. An apparatus as in claim 2 comprising three of said beam adjustment means disposed respectively in the paths of each of said laser beams.

4. An apparatus as in claim 1, wherein the beam adjustment means comprises a planar transparency adjustably mounted in the housing for selected non-perpendicular alignment to the laser beam.

5. An apparatus as in claim 4, wherein the transparency is approximately 0.20 mm thick.

6. An apparatus as in claim 1, comprising a beam diverter for diverting a laser beam 90°, said beam diverter being rotatably mounted to the housing for rotation about an axis substantially coincident with at least one of said laser beams, whereby rotation of the beam diverter about its axis of rotation causes the diverted laser beam to sweep a plane substantially perpendicular to the laser beam impinging upon the beam diverter.

7. An apparatus as in claim 6, comprising a plurality of beam diverters rotatably mounted to the housing for rotation about respective axes coincident respectively with each of said laser beams, whereby rotation of the respective beam diverters about their respective axes of rotation cause the diverted laser beams to sweep a plurality of mutually perpendicular planes.

8. An apparatus as in claim 7, wherein at least one said beam diverter is mounted to a spindle, said spindle and said beam diverter being rotatable in unison about the axis of rotation of the beam diverter, the beam diverter being pivotably mounted to the spindle for rotation into a position spaced from the associated laser beam.

9. An apparatus as in claim 1, wherein each said laser beam defines a cross-sectional area, said apparatus further comprising a spindle for each said laser beam, each said spindle having an aperture aligned with the associated laser beam and defining a cross-sectional area smaller than the cross-sectional area of the laser beam impinging upon the spindle.

10. An apparatus as in claim 9, wherein the spindle is hollow and comprises a threaded interior surface between the laser generating means and the aperture for reducing reflection of the laser beam toward the aperture of the spindle.

11. An apparatus as in claim 1, wherein the laser generating means comprising a separate laser diode for generating each of said laser beams.

12. An apparatus as in claim 1, wherein the laser generating means consists of a single laser diode for producing an input laser beam, and wherein said apparatus further comprises optical means for producing the plurality of generally perpendicular laser beams from the input beam.

13. An apparatus as in claim 12, wherein the optical means comprises a beam splitter for producing at least first and second generally perpendicular laser beams.

14. An apparatus as in claim 12, wherein said optical means is a beam splitter for splitting the laser beam into three generally perpendicular laser beams.

15. An apparatus as in claim 14, further comprising single mode optical fibers extending from the beam splitter for transmitting the plurality of laser beams generally perpendicular to one another from the beam splitter to locations spaced therefrom.

16. An apparatus as in claim 12, wherein said optical means comprises a plurality of single mode optical fibers having ends aligned to receive the input beam from the single laser diode, said optical fibers extending to locations for generating the plurality of laser beams generally perpendicular to one another.

17. A laser apparatus comprising:
   a housing;
   first and second laser diodes for projecting first and second laser beams from the housing, each said laser beam having a central axis, the laser diodes being disposed such that the axes of said laser beams are perpendicular;
   first and second focusing lenses mounted in the housing for focusing the respective first and second laser beams;
   first and second beam shifting means mounted to the housing intermediate the first and second laser diodes and the respective first and second focusing lenses for selectively shifting the laser beams approaching the respective first and second lenses and thereby selectively altering alignment of the laser beams passing from the respective first and second focusing lenses for enabling accurate perpendicularity of the beams;
   first and second beam diverters mounted to the housing for rotation about an axis coincident with the axes of the respective first and second laser beams, said first and second beam diverters diverting the respective first and second laser beams 90°; and motor means mounted to the housing for selectively rotating the first and second beam diverters about said axes, such that the diverted first and second laser beam sweep first and second laser planes that are substantially perpendicular with one another.

18. A laser apparatus as in claim 17 further comprising first and second spindles rotatably mounted to the housing, each said spindle being adjustable in the housing for achieving rotation about an axis of rotation substantially coincident with the axes of the respective first and second laser beams, the first and second beam diverters being mounted to the first and second spindles for rotation therewith.

19. A laser apparatus as in claim 18, wherein the first and second each said beam diverters are hingedly mounted to the respective first and second spindles for hinged rotation into positions spaced from the respective first and second laser beams.

20. A laser apparatus as in claim 18, wherein each said spindle includes a laser aperture substantially centered on the axis of rotation of the associated spindle and defining a cross-section smaller than the associated laser beam for permitting only a central portion of the associated laser beam to pass therethrough.

21. A laser apparatus as in claim 18 further comprising a photosensitive target assembly comprising first and second photosensitive target means for sensing the location of a laser beam impinging thereon, the first and second target means being rigidly spaced from one another by a distance substantially equal to a distance defined between the first laser plane and the second laser beam.

22. A laser apparatus comprising:
a housing;
first, second and third laser diodes for projecting first, second and third laser beams from the housing, each said laser beam having a central axis, and the axes of said laser beams being perpendicular;
first, second and third focusing lenses mounted in the housing for focusing the respective first, second and third laser beams;
first, second and third beam shifting means mounted to the housing intermediate the first, second and third laser diodes and the respective first, second and third focusing lenses for shifting the laser beams approaching the respective first, second and third lenses and thereby selectively altering alignment of the laser beams passing from the respective first, second and third focusing lenses for enabling accurate perpendicularity of the beams;
first, second and third beam diverters mounted to the housing for rotation about axes coincident with the axes of the respective first, second and third laser beams, said first, second and third beam diverters diverting the respective first, second and third laser beams 90°; and
motor means mounted to the housing for selectively rotating the first, second and third beam diverters about said axes such that the diverted first second and third laser beams sweep first, second and third laser planes that are substantially perpendicular with one another.

23. A laser apparatus as in claim 22 further comprising a target assembly having a frame and first, second and third photosensitive target means mounted to the frame for sensing the location of laser beams impinging thereon, the first and second target means being spaced from the third target means by distances substantially equal to the distance between the third laser beam and the first and second laser planes and being disposed with respect to one another such that a line connecting the first and third target means is orthogonal to a line connecting the second and third target means, said target assembly enabling adjustment of the laser apparatus to achieve mutual perpendicularity between the first, second and third laser beams.

24. A laser apparatus comprising:
a housing;
at least one laser generating means mounted in the housing for generating a laser beam;
at least one lens mounted in the housing for focusing the laser beam;
at least one spindle rotatably mounted in the housing for rotation about an axis of rotation substantially coincident with the focused laser beam, said spindle having an aperture therein substantially coincident with the axis of rotation and defining a cross-section smaller than the laser beam passing through the lens; and
at least one beam diverter mounted to the spindle for rotation therewith, said beam diverter being operative to divert the laser beam 90°.

25. A method for achieving mutual perpendicularity between a plurality of laser beams and mutual perpendicularity between a plurality of laser planes, said method comprising the steps of:
providing a laser apparatus having at least first and second laser generating means for generating first and second laser beams approximately perpendicular to one another, first and second focusing lenses for focusing the respective first and second laser beams, first and second beam shifters for shifting the laser beams approaching the respective first and second focusing lenses and first and second beam diverters selectively positionable for diverting the respective first and second laser beams 90°, and motor means for rotating the beam diverters about axes coincident with the focused laser beams passing from the respective first and second focusing lenses and for sweeping first and second mutually perpendicular laser planes with the diverted laser beams;
adjusting the first beam diverter to achieve collinearity of the axis of rotation of the beam diverter to the first laser beam passing from the first focusing lens;
sweeping the first laser plane with the first beam diverter and the first laser beam;
adjusting the second laser beam to be parallel to the first laser plane;
adjusting the second beam diverter such that the axis of rotation thereof is collinear with the second laser beam.

26. A method as in claim 25, wherein the laser apparatus has a third laser generating means for generating a third laser beam approximately perpendicular to the first and second laser beams, a third focusing lens for focusing the third laser beam, a third beam shifter for shifting the third laser beam approaching the third focusing lens and a third rotatable beam diverter selectively positionable for diverting the third laser beam 90° and for rotation about an axis coincident with the focused third laser beam passing from the third focusing lens for sweeping a third laser plane with the diverted third laser beam, said method further comprising the steps of sweeping the first and second laser planes with the first and second beam diverters and the first and second laser beams; adjusting the third laser beam to be parallel to the first and second laser planes; and adjusting the third beam diverter such that the axis of rotation thereof is collinear with the third laser beam.

* * * * *